United States Patent
Marin et al.

[11] Patent Number: 5,936,940
[45] Date of Patent: Aug. 10, 1999

[54] ADAPTIVE RATE-BASED CONGESTION CONTROL IN PACKET NETWORKS

[75] Inventors: Gerald Arnold Marin, Chapel Hill; Lap T. Huynh, Apex; Ken Van Vu; Raif O. Onvural, both of Cary, all of N.C.; Levent Gun, Hopkinton, Mass.; Bouchung Lin, Cary, N.C.

[73] Assignee: International Business Machines Corporation, Armonk, N.Y.

[21] Appl. No.: 08/701,624

[22] Filed: Aug. 22, 1996

[51] Int. Cl.[6] ............... H04L 12/26; H04L 12/56
[52] U.S. Cl. .......... 370/232; 370/465; 395/200.65
[58] Field of Search .................. 370/229, 230, 370/232, 235, 236, 237, 238, 395, 396, 400, 465, 231, 233, 234, 389; 395/200.64, 200.65, 200.68

[56] References Cited

U.S. PATENT DOCUMENTS

| 5,367,523 | 11/1994 | Chang | 370/84 |
| 5,377,327 | 12/1994 | Jain et al. | 395/200.65 |
| 5,675,576 | 10/1997 | Kalampoukas et al. | 370/232 |
| 5,719,853 | 2/1998 | Ikeda | 370/229 |
| 5,748,901 | 5/1998 | Afek et al. | 395/200.68 |
| 5,754,530 | 5/1998 | Awdeh et al. | 370/232 |

OTHER PUBLICATIONS

"Adaptive Admission Congestion Control," Zygmunt Haas, *ACM SIGCOMM Computer Communications Review*, pp. 58–76, 1991.

*Primary Examiner*—Hassan Kizou
*Attorney, Agent, or Firm*—Gerald R. Woods

[57] ABSTRACT

An enhanced adaptive rate-based congestion control system for packet transmission networks uses the absolute rather than the relative network queuing delay measure of congestion in the network. Other features of the congestion control system include test transmissions only after a predetermined minimum time, after the receipt of an acknowledgment from the previous test, or transmission of a minimum data burst, whichever takes longest. The congestion control system also provides a small reduction in rate at low rates and a large reduction in rates at high rates. A logarithmic rate control function provides this capability. Rate damping is provided by changing all of the values in a rate look-up tables in response to excessive rate variations. Finally, the fair share of the available bandwidth is used as the starting point for rates at start-up or when a predefined rate damping region is exited.

17 Claims, 6 Drawing Sheets

ADAPTIVE RATE-BASED CONGESTION CONTROL IN PACKET NETWORKS

TECHNICAL FIELD

This invention relates to packet communications networks and, more particularly, to the control of user access to the network in order to minimize congestion in such networks.

BACKGROUND OF THE INVENTION

In high-speed packet communications networks, several classes of traffic share the common resources of the network. For example, interactive video presents both delay and loss sensitive traffic while voice presents delay sensitive but loss tolerant traffic. File transfers presents loss sensitive but delay tolerant traffic, while datagram services provide traffic which is both delay tolerant and loss tolerant traffic. The first two types of traffic (interactive video and voice) are generally referred to as reserved services since an end-to-end connection must be in place before the user traffic can be launched on the network. The last two types of traffic (file transfer and datagrams), on the other hand, are non-reserved services since they can be launched on the network with no fixed route reserved, but which find their way through the network one link at a time based on local availability. Non-reserved services, often called "best efforts" services, are bursty, delay tolerant and requiring no explicit quality of service guarantee.

Best effort services are extremely useful in maximizing the utilization of the network resources, way beyond the utilization level possible with reserved traffic alone. However, when both reserved and non-reserved traffic are integrated on a single network, it is necessary to ensure that the best effort traffic does not cause degradation of the reserved services traffic. The prior art solves this problem by providing a separate link buffer for the two classes of traffic, and by transmitting best effort traffic only when there is no reserved traffic waiting to be transmitted from the local node onto that link. This arrangement makes the effect of the best effort traffic on the reserved traffic negligible. Typically, a reserved traffic packet would at most wait for the transmission of a single best effort packet. If a link is very slow, a pre-emptive priority can be assigned to the reserved traffic to eliminate even such a minimum single best effort packet delay. If no control is applied to the best effort service, the amount of traffic served approaches the maximum available network capacity, but at the price of creating congestion at the buffers of the network. If congestion causes the loss of transmitted traffic, then it is necessary to retransmit the lost packet, reducing the network utilization.

It is therefore clear that congestion control and congestion avoidance are essential to orderly network management, particularly as the demands generated from best effort traffic approaches or exceeds the available capacity of the network. Two such congestion management systems have been proposed in the prior art, one called Adaptive Rate-Based (ARB) control, disclosed in R.-F. Chang et al. U.S. Pat. No. 5,367,523, granted Nov. 22, 1994, and the other called Adaptive Admission Congestion Control (AACC), disclosed in "Adaptive Admission Congestion Control," by Z. Haas, published in ACM SIGCOMM *Computer Communication Review*, pages 58–76, 1991. Both of these prior art systems rely on the periodic transmission of time-stamped sampling packets through the network on a selected route and then processing of successively received samples to determine the state of congestion on that route. The information gained in this way is used to drive an adaptive admission control mechanism at the entry point to the network for that route.

In the Chang patent, the changes in delay of successive sampling packets are accumulated during a test period until a threshold is exceeded and the sending station is then advised of the event at which time the sending station resets the accumulated delay to zero. The delay information is therefore always relative to a reset point and does not represent the absolute current state of the network. The Chang patent further utilizes a linear function to change the admission rate during path delay changes, resulting in a long initialization time even if the bandwidth for the new data is available. This phenomenon is even worse in high speed networks where the amount of change in data rates is potentially very large.

The Adaptive Admission Congestion Control (AACC) of Haas, on the other hand, uses an averaged delay, implemented by filtering, over a predefined interval (called a "quota"), thereby causing slow reaction to sudden congestion build-up, and truncated reaction to gradual congestion build-up over an interval exceeding the predetermined quota interval. Furthermore, the AACC system continues to send sample packets even when the connection is idle, thereby wasting transmission resources when no congestion can possibly occur.

Major problems, then, with the adaptive congestion control systems of the prior art lie in the inaccurate estimation of path delay in certain circumstances, the use of inappropriate admission increase and decrease change functions, sluggish response to rapid congestion changes and the transmission of unnecessary sample packets during idle periods.

SUMMARY OF THE INVENTION

In accordance with the illustrative embodiment of the present invention, an enhanced adaptive rate-based congestion control mechanism is provided which overcomes the problems of the prior art systems to provide enhanced congestion control in the face of rapid changes in network usage, using absolute rather than relative measures of current congestion and providing admission functions more responsive to the state of congestion in the network. More particularly, the congestion control system of the present invention provides a spacing function for determining the minimum interval between launching of two back-to-back cells entering the network. This spacing function is, of course, based on the currently granted transmission rate.

Furthermore, a sampling policy is enforced in which a sample packet is not sent unless a predetermined minimum sampling period has expired, an acknowledgment of the previous sample packet has been received, and a specified amount of data (called the sampling burst) has been transmitted since the last sampling packet. This sampling policy ensures minimum sampling overhead since the overhead is dominated by the sampling burst when the round trip delay is short (ensuring maximum data throughput) and is dominated by the round trip delay when that delay is long (ensuring minimum sample frequency).

Like the prior art systems, the delay estimation of the present invention is based on the inter-arrival times of successive sample packets. The congestion, measured as network queuing delay, is a function of the difference in departure times of successive sampling packets (calculated from the time stamps in these packets) and the difference in arrival times of these successive sampling packets (measured at the receiving station), assuming that the previous network queuing delay is known. Assuming that the network delay is initially zero, the path delay quickly reduces to the minimum delay suffered by any sample packet. This value can then be used throughout the connection as a close estimate of the actual minimum path delay, allowing calculation of the actual current path delay rather than relying only on relative path delay changes. Using these actual current path delay values, connections are allowed to increase their rates when no incremental delay is detected, to maintain their current rates when the desired network utilization is achieved, to take a small reduction from their current rates when a slight congestion is detected, and to take a large reduction from their current rates when a serious congestion is detected.

Finally, a rate change policy is followed which maximizes efficiency, stability and fairness by providing a large increase in the transmission rate when that rate is low, thereby promoting efficiency, but by providing a small increase in transmission rate when that rate is high, thereby promoting stability. Similarly, reductions in the transmission rate can also be high when the rate is low and low when the rate is high. In accordance with the present invention, a logarithmic function is used to control changes in the transmission rate in response to changes in congestion. This strategy is modified in response to the even sharing of the remaining bandwidth to make the sharing of the overall bandwidth fair.

More particularly, the above-described rate change policy is implemented by a table-driven technique where the permissible rates for each source are stored in a table with the desired logarithmic value changes in successive table entries. Acknowledgments (ACKs), decrease ACKs and increase ACKs, step up or down through the entries in the table to access the next admissions rate. As previously noted, the table entries implement the policy of providing large changes in rate when the rate is low and small changes in rate when the rate is high. In addition, a rate damping region is defined within which it is assumed that even and fair sharing occurs. Although the damping region is initially defined to bracket the starting rate, this damping region is moved up and down in the table in response to movements outside of the damping region. At the same time, the table values are increased or decreased multiplicatively by a preselected factor. This procedure increases fairness over connections that may have different starting times by favoring connections having lower table values compared to connections having higher table values.

In accordance with another feature of the invention, in order to further improve fairness, the enhanced adaptive rate-based congestion control system of the present invention utilizes the current available bandwidth on the network to compute an initial fair share allocation for each new non-reserved connection as that connection is set up. This computation avoids the long start up time during which the prior art new connections must adapt to the current state of the network.

A major advantage of the present invention is that it is an end-to-end control system, requiring no special processing at intermediate nodes along the route, and thus requiring no changes in the processing done at the intermediate nodes.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
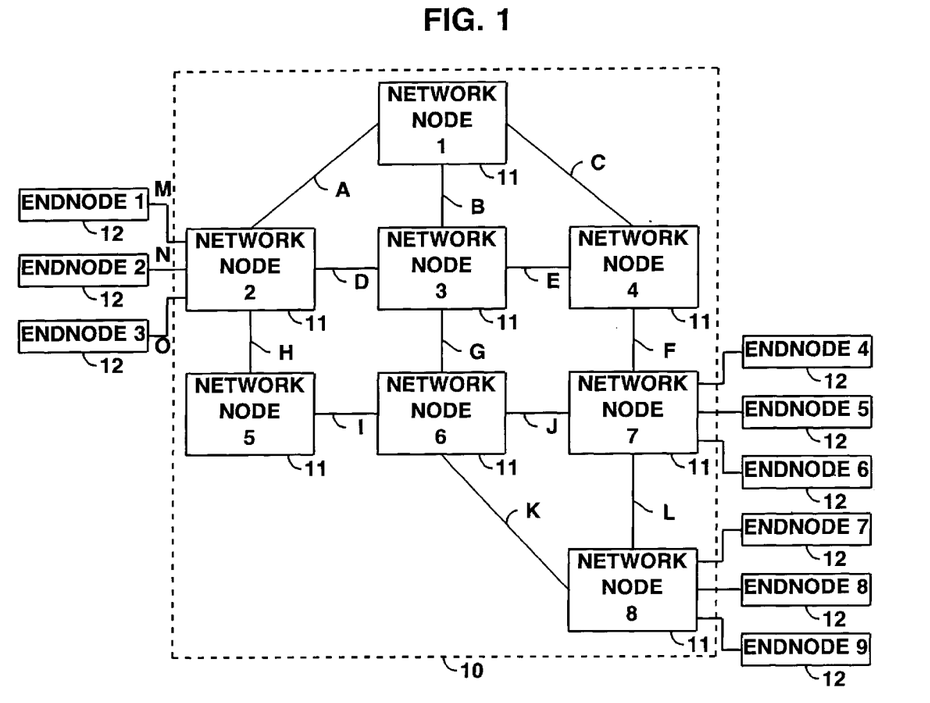
FIG. 1 shows a general block diagram of a packet communications network in which enhanced rate-based adaptive congestion control in accordance with the present invention might find use.

Referring more particularly to FIG. 1, there is shown a general block diagram of a packet transmission system 10 comprising eight network nodes 11 numbered 1 through 8. Each of network nodes 11 is linked to others of the network nodes 11 by one or more communication links A through L. Each such communication link may be either a permanent connection or a selectively enabled (dial-up) connection. Any or all of network nodes 11 may be attached to end nodes, network node 2 being shown as attached to end nodes 1, 2 and 3, network node 7 being shown as attached to end nodes 4, 5 and 6, and network node 8 being shown as attached to end nodes 7, 8 and 9. Network nodes 11 each comprise a data processing system which provides data communications services to all connected nodes, network nodes and end nodes, as well as providing decision points within the node. The network nodes 11 each comprise one or more decision points within the node, at which point incoming data packets are selectively routed on one or more of the outgoing communication links terminated within that node or at another node. Such routing decisions are made in response to information in the header of the data packet. The network node also provides ancillary services such as the calculation of new routes or paths between terminal nodes, the provision of access control to packets entering the network at that node, and the provision of directory services and topology database maintenance at that node. In accordance with the present invention, the end nodes 12 provide enhance rate-based congestion control for data packets transmitted through the network of FIG. 1.

Each of end nodes 12 comprises either a source of digital data to be transmitted to another end node, a utilization device for consuming digital data received from another end node, or both. Users of the packet communications network 10 of FIG. 1 may utilize an end node device 12 connected to the local network node 11 for access to the packet network 10. The local network node 11 translates the user's data into packets formatted appropriately for transmission on the packet network of FIG. 1 and generates the header which is used to route the packets through the network 10. In accordance with the present invention, one or more of nodes 11 and 12 of FIG. 1 is equipped to provide enhanced rate-based adaptive congestion control for access to the network of FIG. 1.

In order to transmit packets on the network of FIG. 1, it is necessary to calculate a feasible path or route through the network from the source node to the destination node for the transmission of such packets. To avoid overload on any of the links on this route, the route is calculated in accordance with an algorithm that insures that adequate bandwidth is available on each leg of the new connection. One such optimal route calculating systems is disclosed in U.S. Pat. No. 5,233,604 granted Aug. 3, 1993. Once such a route is calculated, a connection request message is launched on the network, following the computed route and updating the bandwidth occupancy of each link along the route to reflect the new connection. Data packets may then be transmitted along the calculated route from the originating node to the destination node (and from the destination node to the originating node) by placing this route in the header of the data packet. In prior art systems, if the network of FIG. 1 became congested, the network would detect this condition and attempted to limit the access of traffic to the system. More particularly, test packets sent through the network with a time stamp are used to estimate the congestion in the network, based on the chances in the transit times of successive test packets. The present invention is an improvement on these prior art adaptive control systems.

Figures 2, 6:
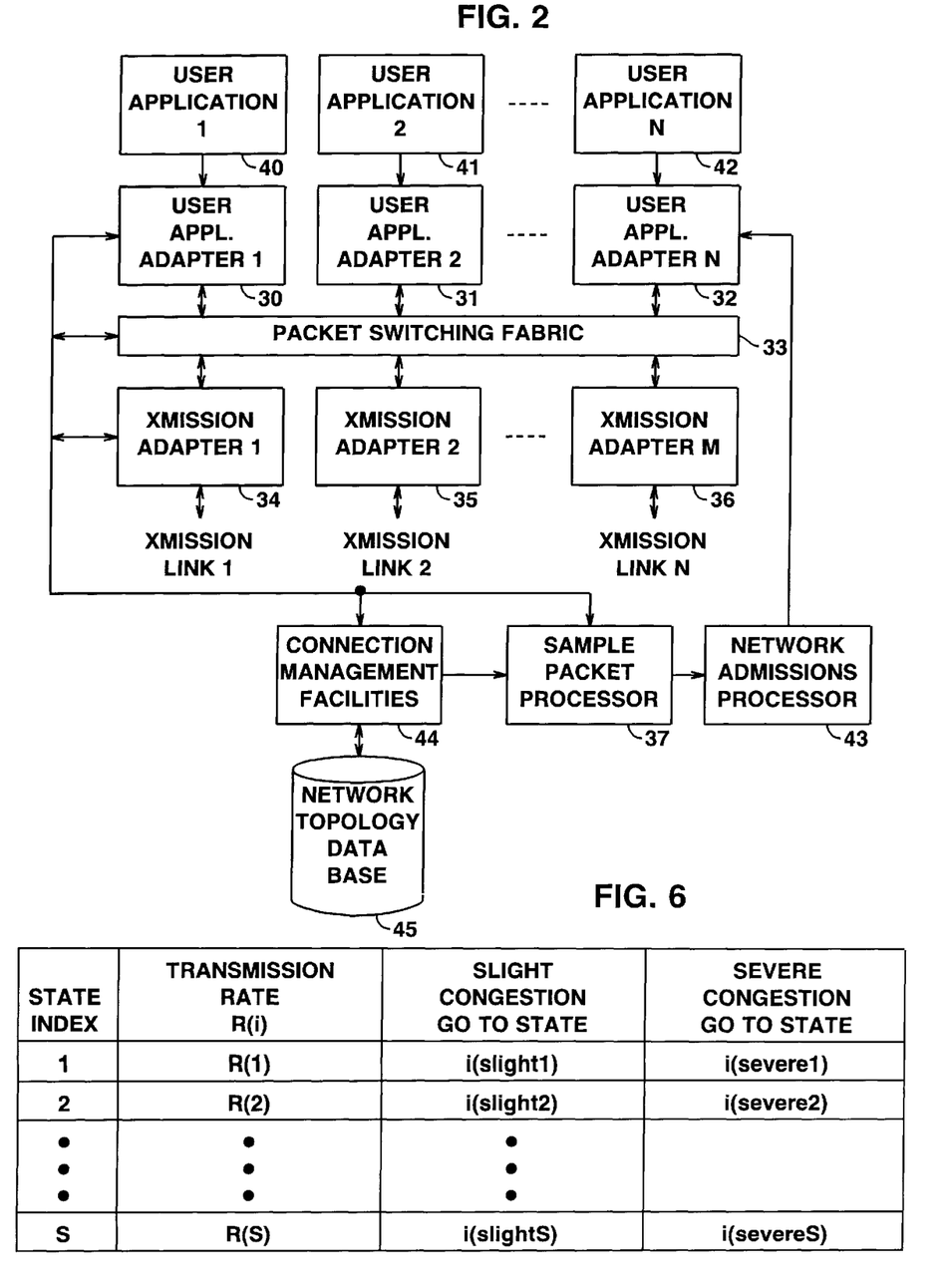
FIG. 2 shows a more detailed block diagram of typical endnode in the network of FIG. 1 at which point packets may enter the network to be forwarded along the route to a destination for each packet, and in which network access mechanisms in accordance with the present invention might be implemented.
FIG. 6 is a rate table which might find use with the present invention.

In FIG. 2 there is shown a general block diagram of a network endnode control circuit which might be found in all of the end nodes 12 of FIG. 1. The endnode control circuit of FIG. 2 comprises a high speed packet switching fabric 33 onto which packets arriving at the node are entered. Such packets arrive over transmission links from network nodes of the network, such as links M-O of FIG. 1 via transmission interfaces 34, 35 or 36, or are originated locally via local user interfaces 30, 31 or 32 from user applications 40, 41, . . . , 42. Switching fabric 33, under the control of connection management facilities 44, connects each of the incoming data packets to the appropriate one of the outgoing transmission link interfaces 34–36 or to the appropriate one of the local user interfaces 30–32, all in accordance with well known packet network operations. Indeed, network management control messages are also launched on, and received from, the packet network in the same fashion as data packets. That is, each network packet, data or control message, transmitted on the network of FIG. 1 can be routed by way of switching fabric 30, as shown in FIG. 2.

Routes or paths through the network of FIG. 1 are calculated to satisfy the Quality of Service (QoS) parameters determined to be necessary to adequately transmit a particular data stream, as taught in the afore-mentioned U.S. Pat. No. 5,233,604. These Quality of Service parameters include such things as throughput (bandwidth), latency (path delay) and jitter (latency variations). Assuming that only one class of traffic requires preselected QoS parameters, called reserved traffic, and that at least one other class of traffic can be transmitted on a "best efforts" basis, the maximum use of the network occurs when any available capacity not currently used by the reserved traffic is filled with best effort traffic. Since the reserved traffic must be transmitted in a timely fashion, it is necessary to control the access of the best efforts traffic so as not to interfere with the reserved traffic. Since, due to changes in traffic loading or outages, congestion occurs in the packet network of FIG. 1, it is necessary to restrict the access of best effort traffic to the network in such a way as to reduce the congestion in the network and allow the reserved traffic to flow unimpeded. One known technique for controlling access to the network is to estimate the congestion in the network and to adjust the input to the network so as to reduce such congestion. In accordance with one well known congestion estimation technique, taught in R.-F. Chang et al. U.S. Pat. No. 5,367,523, granted Nov. 22, 1994 and in "Adaptive Admission Congestion Control," by Z. Haas, published in ACM SIG-COMM *Computer Communication Review*, pages 58–76, 1991, a sample test packet is transmitted from the source of each data stream to the destination for that data stream. From time stamps carried by the test packets, the receiving station estimates congestion by identifying changes in the transit times of the test packets. The present invention is an improvement on these latter systems using test packets to estimate the congestion in the system of FIG. 1. More particularly, the present invention attempts to estimate the actual level of congestion in the network, rather than relying on relative congestion, i.e., changes in congestion, during successive test sample transmissions. This approach can be better seen from the congestion estimation system in the block diagram of FIG. 3.

Returning to FIG. 2, connection management facilities 44 utilize the contents of network topology data base 45 to calculate reserved and best efforts paths through the network of FIG. 1 in response to requests from users 40–42. A sample packet processor 37 generates sample test packets for transmission from the end node of FIG. 2 as well as providing the received sample packet processing necessary for test sample packets originating at other end nodes and intended for the end node of FIG. 2. Using the results of this received sample processing, network admissions processor 43 generates control signals to control the access of best effort signals from user applications 40–42 in user application adapters 30–32, respectively.

Figure 3:
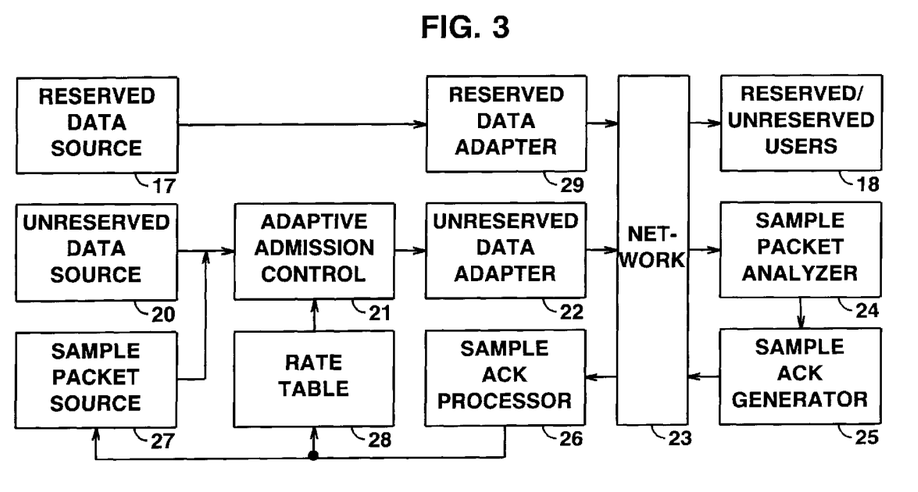
FIG. 3 shows a general block diagram of an enhanced rate-based network congestion control system in accordance with the present invention.

Referring then to FIG. 3, there is shown a general block diagram of the test sample packet processing taking place in blocks 37 and 43 of FIG. 2. More particularly, reserved data source 17 corresponds to one of the user applications 40–42 and delivers reserved data packets to network entry buffer 29 for delivery to network 23, corresponding to the network of FIG. 1. This reserved data traffic is delivered through network 23 to reserved user 18 at a remote end node of network 23. An unreserved data packet source 20 corresponds to another one of user applications 40–42 and generates non-reserved (best efforts) data packets for transmission on network 23, corresponding to the network of FIG. 1. An adaptive admissions control circuit 21 controls the rate at which unreserved data packets from unreserved data source 20 are applied to network entry buffer 22, which, in turn, supplies the sample packets to network 23. The adaptive admissions control circuit 21 is of a type well known in the are such as that disclosed in H. Ahmadi et al. U.S. Pat. No. 5,311,513, granted May 10, 1994, and will not be further described here. A test sample packet generator 27 generates test sample packets which are applied through admission control circuit 21 to network entry buffer 22 for transmission on network 23.

At the remote destination end node, the data packets from sources 17 and 20 are delivered to reserved/unreserved users 18. At the remote location, a sample packet analyzer 24 receives the test sample packets generated in sample packet generator 27, processes these samples to obtain an estimate of the absolute value of the current state of congestion in the path between data packet source 20 and sample packet analyzer 24. In accordance with the present invention, the state of congestion is approximated by the current length of the queuing delay in network 23. In response to this estimate of congestion, sample acknowledgment generator 25 generates an acknowledgment of the receipt of each sample packet and transmits this acknowledgment back over network 23 containing a coded estimate of the current queuing delay on this connection through network 23. This acknowledgment is delivered through network 23 to sample acknowledgment processor 26 at the source end node of the original sample packet. This sample acknowledgment is used by sample packet generator 27 to assist in the control of the generation of new sample packets. The received acknowledgment is also used to access rate table 28, the accessed rate being used in adaptive admissions control 21 to adaptively adjust the rate of admission of unreserved data in response to the estimated absolute level of congestion in the network.

Before proceeding to a detailed description of the balance of the drawings, it will be useful to outline the major components of the heuristic algorithm for enhanced rate-based adaptive congestion control which forms the subject matter of the present invention. It should be first noted that the traffic originating at any one of end nodes of FIG. 2 consists of at least two different types of signals. A first type of signal, previously called reserved traffic, has a reserved path through the network, having a predefined bandwidth, delay and jitter negotiated at the time the reserved path is set up by connection management facilities 44 of FIG. 2. This reserved traffic has first call on the network resources and, so long as such reserved traffic is present for transmission, the reserved traffic is transmitted, up to the capacity of the network. Typical examples of reserved traffic are voice and interactive video.

It is also well known that the reserved traffic is generally not continuous and considerable network capacity exists, from time to time, after serving all of the reserved traffic. The problem in making the network more efficient is using the excess capacity of the network without significantly effecting the timely delivery of the reserved traffic. It is also well known to insert non-reserved traffic, having less stringent transmission requirements, into the network so as to use up the excess transmission capacity of the network. Such non-reserved traffic might comprise file transfers or datagram services and has the characteristics of being bursty, being tolerant to delay, and requiring no explicit quality of service guarantees. This non-reserved traffic, sometimes referred to as "best efforts" services, is best utilized to increase the efficiency of the network when the maximum amount of left over bandwidth is used efficiently, shared fairly among all users and requires minimum overhead. The enhanced rate-based adaptive congestion control system of the present invention serves to regulate the non-reserved traffic submitted to the network in response to the current status of congestion in the network resources. The present invention is an end-to-end control scheme requiring no special processing at intermediate nodes and which uses a sequence of control packets or cells ("sample cells") to collect congestion information about the network which, in turn, is used to adjust the rate at which best effort, nonreserved traffic is admitted to the network.

More particularly, the heuristic algorithm of the present invention is comprised of five major elements which, when used together, provide significant improvement in the efficient operation of packet networks such as that illustrated in FIG. 1. The first element of this algorithm is a spacer function which enforces a minimum rate at which the best efforts unreserved data can be transmitted from the sending station. This spacer function is implemented in admission control circuit 21 of FIG. 3 and might, for example, comprise a simple time-out function. A second element of the algorithm is a sampling strategy in which a new sample can be sent only if the sampling period has expired, only if the acknowledgment of the previous sample has been received, and only if a minimum amount of unreserved data, called the sampling burst, has been transmitted into the network since the last sample was sent. This strategy ensures efficient sample transmissions by eliminating or minimizing sampling when the transmission rate is low or the traffic is zero, by requiring sampling only when transmission rate changes are possible, i.e., after receipt of an acknowledgment, and, finally, under high rates and short round trip delays, limiting the sampling rate by the spacer function.

A third element of the heuristic algorithm of the present invention is the method of estimating the delay of the sampling cells, representing the congestion in the network. This delay is estimated as the immediately preceding delay less the difference between the inter-arrival times of the two immediately preceding sampling cells and the inter-departure times of the two immediately preceding sampling cells, i.e., $$Q_n = Q_{n-1} + M_r - M_s,  \qquad (1)$$

where $M_s$ is the inter-departure time of two consecutive sampling cells at the sender, $M_r$ is the inter-arrival time of two consecutive sampling cells at the receiver.

$Q_{n-1}$ is the estimated queuing delay of the previous sampling cell.

$Q_n$ is the estimated queuing delay of the current sampling cell.

When the first sampling cell is transmitted, the network delay is assumed to be zero. On the arrival of the second sampling cell, the value ($Q_2$) of the network delay is the difference between the network delays of the two sampling cells. This value can be either positive (increasing delay) or negative (decreasing delay). If this difference is negative, the value of $Q_2$ is set to zero. The error in the estimation of the network delay is therefore bounded by the smallest previous estimate, and can only reduced by further sampling cells. That is, since sampling cells are continuously transmitted throughout the life time of the connection, the absolute delay for the sampling cells can be found if only one sampling cell travels through the network without any queuing delay. Note in this connection, that the overall network delay is made up of the transmission delays in all of the links in the path, the propagation delay, the processing delay, and the queuing delays accumulated at the nodes in the path, to accommodate the traffic flowing through the nodes. The minimum delay measured at the receiving station, then, is the accumulated total delay, assuming that no queuing delay is necessary at intermediate nodes. It is the queuing delay, and the queuing delay alone, that is a measure of the congestion. In order to allow the network to reach an uncongested state before excessive adaptive changes, and thus to get a good approximation of the queuing delay, it is important that the initial rate of sending sampling cells be set relatively low.

Figure 4:
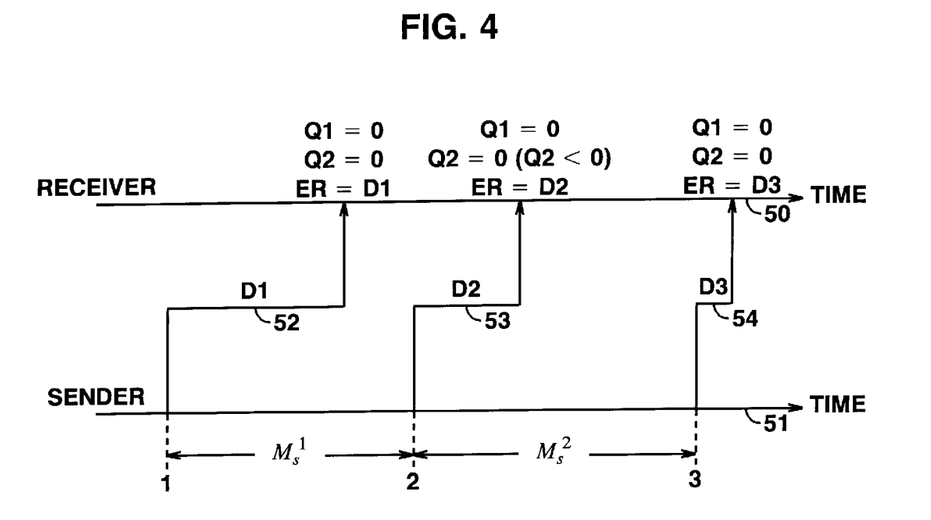
FIG. 4 is a graphical representation of successive transmissions of sample packets through the network of FIG. 1, useful in understanding the rate-based congestion control system of the present invention.

To illustrate the rapid convergence of the queuing delay estimation, FIG. 4 illustrates the transmission of the first three successive sampling cells on a particular connection. As can be seen in FIG. 4, the network delays 52, 53 and 54, are assumed to be monotonically decreasing. Note that the error (ER) at each successive sampling cell is reduced and never grows larger for any possible future sampling cell delays. That is, the queuing delay estimate error goes to zero whenever the queuing delay itself goes to zero, at any time during the connection.

The fourth element of the heuristic algorithm of the present invention is the division of the estimated delays into four categories representing four different categories of congestion, called congestion states (CSs):

1) Network is free. Virtually no delay has been detected. All non-reserved connections are allowed to increase their transmission rates. This congestion state is coded "01," i.e., CS=01.

2) Desired Network Condition. A desired network utilization level has been achieved. All connections should maintain their current rates. This congestion state is coded "00."

3) Slight Congestion. A small amount of congestion has been detected in the network. All connections should take a small reduction from their current rates of transmission. This congestion state is coded "10."

4) Serious Congestion. A serious congestion condition has been detected in the network. All connections should take a large reduction from their current transmission rates. This congestion state is coded "11."

These different congestion conditions are coded into the sampling packet acknowledgment signal from the receiving station to appropriately control the rate changer at the sending station.

The fifth and last element of the heuristic congestion control algorithm of the present invention is the strategy used to adjust the non-reserved transmission rate when a particular level of congestion is detected. In order to ensure efficiency, stability and fairness, a large change in the allowed rate is permitted when the allowed rate is low (to increase efficiency), but only a small change in the allowed rate is permitted when the allowed rate is already high (to increase stability). A logarithmic relationship between rate changes and congestion (delay) changes is used in the heuristic algorithm of the present invention. In order to ensure fairness and efficiency, the heuristic algorithm takes the following further steps:

1) Modify the allowed rate, based on a logarithmic function such as:

$$X(t+1) = C \times \ln(\exp(X(t)/C) + \Delta), \quad (2)$$

where
X(t) and X(t+1) are the allowed rates at times t and (t+1), respectively,
C is a scaling factor to be selected heuristically,
Δ is a constant which, for convenience, is set to 1.

2) Determine the current fair share of the remaining bandwidth, at the starting point after the available rate is determined, which is available for the new best efforts connection.

3) Scale all of the non-reserved transmission rates, if necessary, to ensure fairness in sharing and efficient use of the total available bandwidth (available after all reserved traffic is served).

If r is the number of reserved connections on the link, the remaining bandwidth $C_A$ available for best efforts services is given by $$C_A = \alpha C_T - \sum_{i=1}^{r} \hat{c}_i, \quad \text{where} \quad (3)$$

α is the target link utilization factor,
$C_T$ is the total link capacity, and
$\hat{c}_i$ is the bandwidth allocated to the reserved connection i.
The rate for a best effort connection j is therefore $$F_j = C_A/n, \quad (4)$$

where
n is the number of best effort connections.

Figure 5:
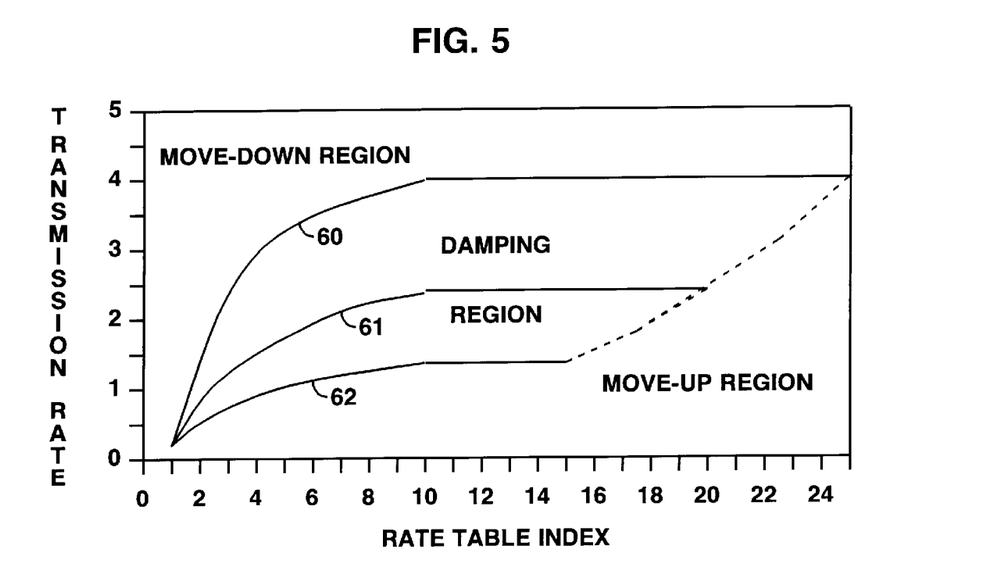
FIG. 5 is a graphical representation of possible transmission rate growth curves useful in understanding the rate-based congestion control system in accordance with the present invention.

In order to satisfy all of the rate changing elements described above, the present invention utilizes a table driven rate changing mechanism where the entries in the table are the projected increases in allowable rates ($F_i$) for a particular non-reserved data source, and the number of table entries (S) have the relationship illustrated in FIG. 5 and given by $$R(i+1) = C * \ln\left(\exp\left(\frac{R(i)}{C}\right) + \Delta\right), \quad \text{for } i \geq 2, \quad (5)$$

where R(i) and R(i+1) are the projected allowed rates at successive table entries,
R(1) is the initial rate,
C is a scaling constant, and
Δ is a constant conveniently set to one.

One such table is required for each non-reserved source using the network of FIG. 1. Such tables are contained in the network admissions processor 43 of FIG. 2 and in the rate table 28 of FIG. 3 and will be discussed in more detail in connection with FIG. 6. As can be seen in FIG. 5, each value of the table index can be used to access a number of rate values illustrated by lower limit values 62, through median values 61 to upper limit values 60. For simplicity, the very slowly changing rate values at the higher index values are approximated by straight horizontal lines at the right hand ends of curves 60, 61 and 62 in FIG. 5. The differences between curves 60–62 correspond to different constant multipliers (identified as C in equation (5)) to provide different ranges of rate values. This variability allows for multiplication (and division) of table values to accommodate various loading on the network.

If the rate values illustrated in FIG. 5 are implemented by a table look up, a standard S-entry table R, where each table entry R(i) is given by equation (2), where R(i) is X(t) and C assumes various integer values to create curves like curves 60, 61 and 62. The value of the rate R(i) is initially chosen to equal the projected even share rate on the most likely congested link, using equation (4) and the value of S is chosen to satisfy the desired level of aggressiveness, i.e., a desired one of curves corresponding to curves 60, 61 and 62. If the variable STATE is the rate table index pointing to the current allowed rate in the table R, the described rate change policy can be implemented as follows: STATE is initially set to 1, pointing to the first value in the rate table R. An increase acknowledgment will increase STATE by one to locate a new, higher rate in the table. STATE can be reduced by a factor to move STATE to a lower value and to locate a new, lower rate in the table. Since there are two kinds of decreases, a small reduction for slight congestion and a large reduction for serious congestion. That is 1. STATE=DE1×STATE, if SMALL REDUCTION (CS= 10) is received, and 2. STATE=DE2×STATE, if LARGE REDUCTION (CS= 11) is received, where DE1 and DE2 are a constants less than one and greater than zero, and DE2 is less than DE1. The values of DE1 and DE2 are determined heuristically, but values of 0.9 and 0.5, respectively, have been found to be usable.

The second step of the rate change policy involves assuming that an even share of the available bandwidth has been achieved if the variable STATE oscillates within a pre-defined "Damping Region." This Damping Region (illustrated in FIG. 5) is initialized as (L, L+DR) where L is the lower limit (e.g., curve 62) and DR is the size of the damping region (e.g., the region between curve 60 and 62), where L and DR are determined heuristically, observing actual stability values. In FIG. 5, it is assumed that DR is equal to ten. As previously noted, curves 60, 61 and 62 are obtained by varying the constant C in equation (5) to obtain the various rate values. The middle curve 61 is assumed to be the initial rate table values, and curve 60 represents the rate table values after the rates have moved up five times. Curve 62 represents the rate table values after the rates have move down five times. For illustrative purposes, these values represent an initial Damping Region between curves 60 and 62. If STATE stays within the Damping Region, the table R is considered to be appropriate for the current network conditions.

If STATE grows outside of the Damping Region, due to successive increase acknowledgments, the third step in the rate change policy is used. In this case, the entire table is increased by multiplying each value by a predefined factor greater than one, defined as moving the damping region up by one step, i.e., L=L+1. If this occurs, the value of the variable STATE is reset to its initial index value. On the other hand, if STATE never reaches the value L, the table R is considered to be too high and the entire table R is reduced by multiplying each value in the table by a predefined factor less than one, defined as moving the damping region down by one step, i.e., L=L−1. The value of the variable STATE is then reset to its initial index value. The multiplicative modification of the table R preserves the logarithmic characteristic of the rate. Fairness between the different best efforts connections may be lost since they would all be using different rate tables due, possibly, to different start up times. The linear movement of the Damping Region, and the resetting of the value of STATE, tends to favor the connections using the lower valued tables versus those using higher value tables, thus minimizing the fairness divergence. This entire rate change policy is summarized in the pseudo-code given in the APPENDIX.

Rather than starting the initial transmission rate at zero, requiring a long start-up time to come to an appropriate rate, equation (4) is used when each new best efforts connection is started to set the initial rate at a value satisfying the basic fairness criterion. Rates for all connections can also be reset when the Damping Region is moved. It is noted, however, that fairness of access in the sense defined in equation (4) does not necessarily maximize the total network throughput since some traffic sources (e.g., file servers or routers) inherently use more bandwidth than other traffic sources. It may therefore be desirable to allocate bandwidth to the various traffic sources in a weighted manner, reflecting their average bandwidth requirements. This is sometimes called proportional fairness.

To allow for unequal allocation of available bandwidth to best efforts connections, each best effort traffic source is allocated an initial rate that is proportional to its need. The fairness function for such a proportional fairness policy can be defined as:

$$S_j = \frac{MCR_j}{\sum_{j=1}^{n} MCR_j}, \quad \text{where} \tag{6}$$

$MCR_j$ is the minimum cell rate guaranteed by the network to best effort connection j.

Turning now to FIG. 6, there is shown a typical rate table consisting of essentially four columns. The first column is the STATE or index value which is not actually in the table, but assists in understanding the operation of the table. The second column is the transmission rate. Successive transmission rates in the table of FIG. 6 are related to each other logarithmically as suggested in FIG. 5. The third column of the rate table of FIG. 5 are the next STATE or index value to go to for the slight congestion condition while the fourth column are the next STATE or index value to go to for the severe congestion condition. That is, the next rates used under slight congestion conditions are different from (less than) the next rates used for severe congestion conditions. This allows the rate to move down faster in severe congestion conditions than in slight congestion conditions, all as described above to insure stability in the unreserved data transmission rate. This process can be better seen in connection with the following description of the flow charts of FIGS. 7 through 9.

Figure 7:
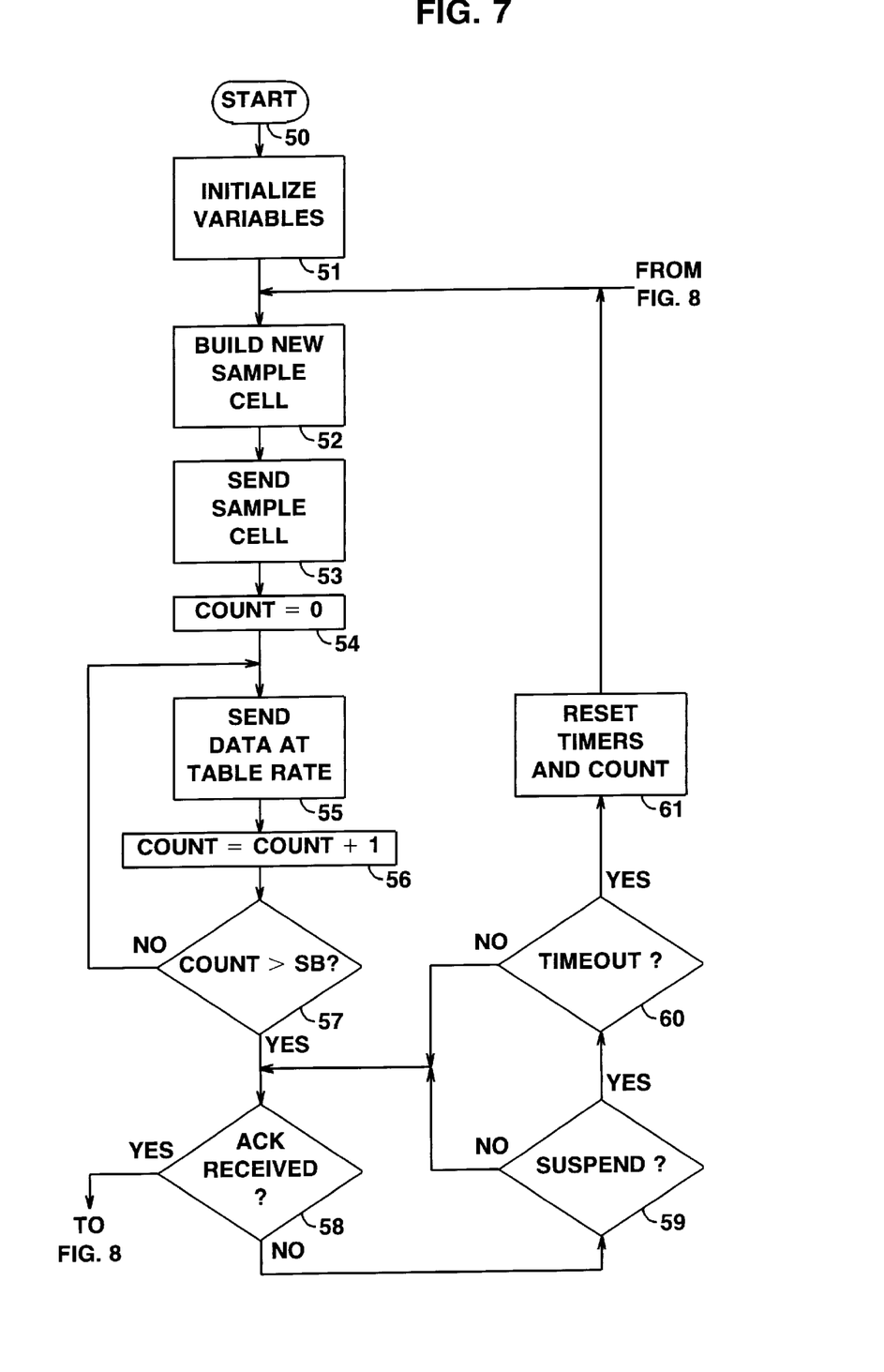
FIG. 7 shows a flow chart of the processing of sample cells at the source station of an unreserved data source showing the sampling policy in accordance with the present invention.

In FIG. 7 there is shown a flow chart of the procedures taking place in the source node for an unreserved, best efforts connection to launch new sample packets needed to measure network congestion. Starting in start box 50, box 51 is entered where the connection variables are initialized. These variables include:

The Round Trip Time (RTT) estimate is the initial value of the round trip time required to transmit a packet from the source to the destination, and back. The value of RTT is estimated from network data stored in topology data base 45 (FIG. 2). This value is useful in setting the maximum values for the suspend and time-out timers, as will be described below.

The Slowest Link Capacity (SLC) is obtained from the topological data base 45 (FIG. 2). The SLC is used to calculate D1, D2 and D3, e.g., D1 may be set at one cell duration on the Slowest Link Capacity link, D2 may be set to approximately ten cell durations, and D3 may be set at approximately 200 cell durations.

D1 is the maximum delay for a rate increase. If the delay estimate is below this value, the rate is increased until the delay reaches this delay value.

D2 is the delay threshold indicating slight congestion in the network. If the delay estimate exceeds D2, the rate is decreased a small amount to relieve the slight congestion. If the delay estimate is between D1 and D2, no change in rate occurs since this is the range of delays representing the desired operating point for the network.

D3 is the delay threshold indicating serious congestion in the network. If the delay estimate exceeds D3, the rate is decreased by a large amount to quickly relieve the serious congestion in the network.

Figure 8:
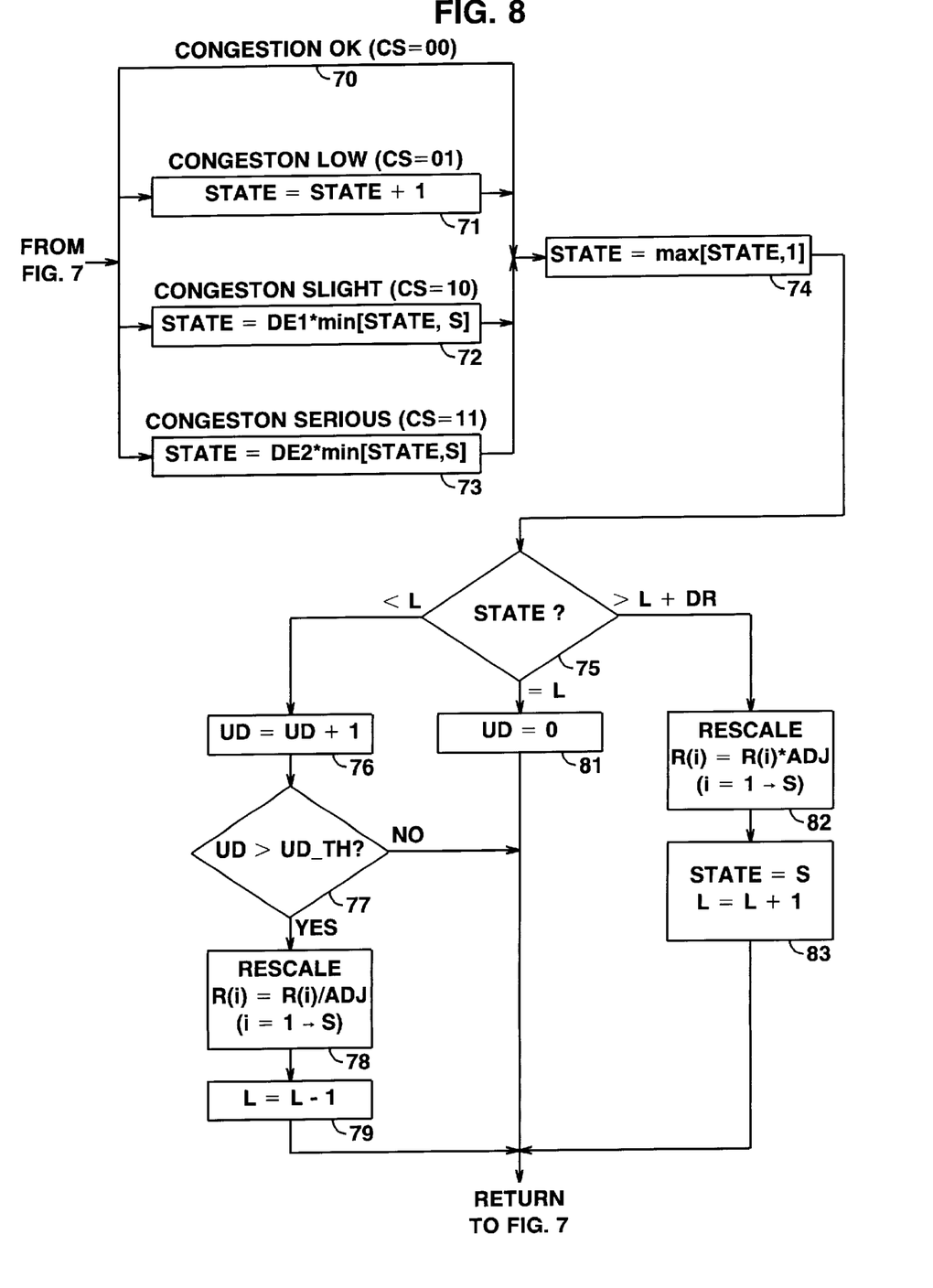
FIG. 8 shows a flow chart of the rate state processing in accordance with the present invention.

All of the above values are made available to the procedures of FIGS. 7 and 8. In addition, in box 51, the value of L is set to S, that is, the lower bound 62 (FIG. 5) of the damping region is set to the current rate state or index. The value of UD, the number of sampling cells sent while the value of STATE is below L, i.e., the number of increases in L in the damping region. When UD exceeds UD_TH, the upper limit of the damping region (FIG. 5), the table rates are adjusted upward by a predetermined factor. In initialization box 51 the value of UD is set to zero and the value of UD_TH is set to 2 L. That is, the number of sampling cells below the damping region is set to zero and the size of the damping region initialized at the value show in FIG. 5.

When the initializations are completed in box 51, box 52 is entered where the next sample cell is constructed. This sampling cell includes a time stamp indicating the current time. Box 53 is then entered where the sample cell constructed in box 52 is launched on the network of FIG. 1. If necessary, at the same time two timers are reset. One timer, called the time-out timer (T_OUT=0), measures the time since the last sample cell acknowledgment. When the time-out timer reaches a predetermined maximum level (e.g. twice the calculated round trip time on this connection) at which time it is assumed that the connection has been lost. The connection should be reestablished, the flow chart of FIG. 7 reset to its initial state and a new sample cell transmitted. The other timer, called the suspend timer (T_SUSPEND= 0), is used to suspend the transmission of unreserved traffic on this connection. The suspend timer is set to a value much less than the time-out timer, and represents a delay level at which it is assumed that the delay is due to substantial congestion on this connection. To relieve this assumed congestion, unreserved data traffic from box 55 is suspended, thus allowing the congestion to decrease. The suspend time period is, of course, substantially less than the time-out period. Both the suspend timer and the time-out timer are reset to zero in box 53 when a new sample cell is transmitted.

Box 54 is then entered where the value of COUNT is set to zero. The value of COUNT is the number of unreserved data cells transmitted since the most recent sampling cell. Box 55 is then entered where unreserved data cells are transmitted on the connection at the rate specified by the rate table indexed by the STATE initialized in box 51. Box 56 is then entered to increment the COUNT by the number of data cells transmitted in box 55. Decision box 57 is then entered to determine if the number of data cells transmitted in box 55 exceeds a predetermined value called the sampling burst (SB) which is the minimum number of data cells which must be transmitted before the next sampling cell can be transmitted. As discussed above, this sampling burst requirement makes the adaptive rate-based algorithm of the present invention more efficient by preventing the transmission of sampling cells when the connection is idle or the data rate is very low.

If the count of data cells ("COUNT") is not greater than the minimum sampling burst SB, as determined by decision box 57, box 55 is re-entered to continue sending data cells on this connection. If the count of data cells does exceed the minimum sampling burst SB, as determined by decision box 57, decision box 58 is entered to determine if an acknowledgment for the sample cell sent in box 52 has been received back at the sending source of that sample cell. If an acknowledgment has been received, the STATE processing flow chart shown in FIG. 8 is entered. If an acknowledgment has not been received, decision box 59 is entered to determine if the suspend timer has expired. If the suspend timer has expired, data transmission is suspended in box 55 and decision box 60 is entered to determine if the time-out timer has expired. If both the suspend timer and the time-out timers have expired, as determined by decision boxes 59 and 60, respectively, box 61 is entered to reset all of the timers, reset the data burst count and reinitialize the data rate and all of the other variable initialized in box 51 by re-entering box 52. If either of these two timers has not expired, as determined by decision boxes 59 and 60, decision box 58 is re-entered to continue to wait for the receipt of an acknowledgment of the previously transmitted sample cell. Note that, in accordance with the flow chart of FIG. 7, the transmission of the next sample cell must await the later of the transmission of a minimum unreserved data burst, the receipt of an acknowledgment or the expiration of a time-out period. The efficient use of network facilities by minimizing the number of sampling cells, discussed above, is implemented by the flow chart of FIG. 7. The receipt of an acknowledgment of the previous sample cell, as determined by decision box 58, requires the processing of that acknowledgment (box 26, FIG. 3). This processing takes place in the flow chart of FIG. 8.

In FIG. 8 there is shown a flow chart of the acknowledgment processing taking place at the source of the unreserved traffic being monitored and adaptively controlled. Starting at the upper left of FIG. 8, the flow chart splits into four branches 70, 71, 72 and 73, corresponding to the four congestion states coded into the acknowledgment, as will be discussed in connection with FIG. 9. These four congestion states correspond to codes "00" (congestion acceptable as within the desired range), "01" (congestion below target levels), "10" (congestion slight) and "11" (congestion serious). In branch 70 (CS=00), nothing is done since the rate STATE is acceptable. In branch 71, STATE is incremented by one to increase the data transmission rate to the next value in the table of FIG. 6. In branch 72 (CS=10), the rate state is set at a value equal to the product of a constant DE1 (noted above as a small reduction factor, such as 0.9) and the minimum of the current value of STATE and the maximum permissible value of STATE (S). This results in a value for STATE which is reduced from the current STATE by the small reduction factor DE1. In branch 73 (CS=11), the rate state is set to a value equal to the product of a constant DE2 (noted above as a large reduction factor, such as 0.4) and the minimum of the current value of STATE and the maximum permissible value of STATE (S). This results in a value for STATE which reduced from the current value of STATE by a large reduction factor DE2. All of branches 70, 71, 72 and 73 are entered into box 74 where the value of STATE is set to the value calculated in branches 70–73 or to "1," whichever is higher. That is, the reduction in the value of STATE is not allowed to fall below the value "1."

After the new value of STATE is calculated, as described above, decision box 75 is entered to determine the range of values into which the calculated new value of STATE falls. As can be best seen in FIG. 5, the possible range of values of the rate R(i) is divided up into a damping region, between curves 60 and 62, a move-down region, above curve 60, and a move-up region, below curve 62. The move-up region is detected in decision box 75 where the value of STATE is less than L. Box 76 is then entered where the count UD is incremented by one. It will be recalled that UD is a count of the number of data cells transmitted since the value of STATE was below L. Decision box 77 is then entered to determine whether the value of UD has exceeded the value UD—TH. UD—TH is a threshold which, when exceeded, causes the desired damping region to be scaled down so as to encompass the recent values of STATE. In box 78, this resealing is accomplished by dividing each rate value in the second column of the rate table (FIG. 6) by a fixed value ("ADJ"). This reduction in the rates moves all of the rate values down to span the newly calculated STATE values. In box 79, the value of L is decremented by one to properly represent the new lower level of the damping region (FIG. 5). The process then returns to FIG. 7 to trigger the transmission of a new sample cell and to utilize the new rate value for future data transmissions.

Returning to decision box 75, if the value of STATE is equal to L, that is, the STATE value is equal to the lower boundary of the damping region, box 81 is entered where the value of UD is reset to zero, indicating that the number of sampling cells below the damping region must be reset. If the value of STATE is greater than the sum of L and DR, that is, if the value of STATE is above the damping region, box 82 is entered to rescale the values of the data rates upward, thereby accommodating the new value of STATE. The rescaling is done with the same factor ADJ used in box 78, but used multicatively instead of by division to increase the values of the data rates in the second column of the table in FIG. 6. After rescaling the data rates in box 82, box 83 is entered where the value of STATE is set to the maximum value S and the value of L is incremented by one. The process then returns to FIG. 7 to send a new sample cell and to use the new rate.

Figure 9:
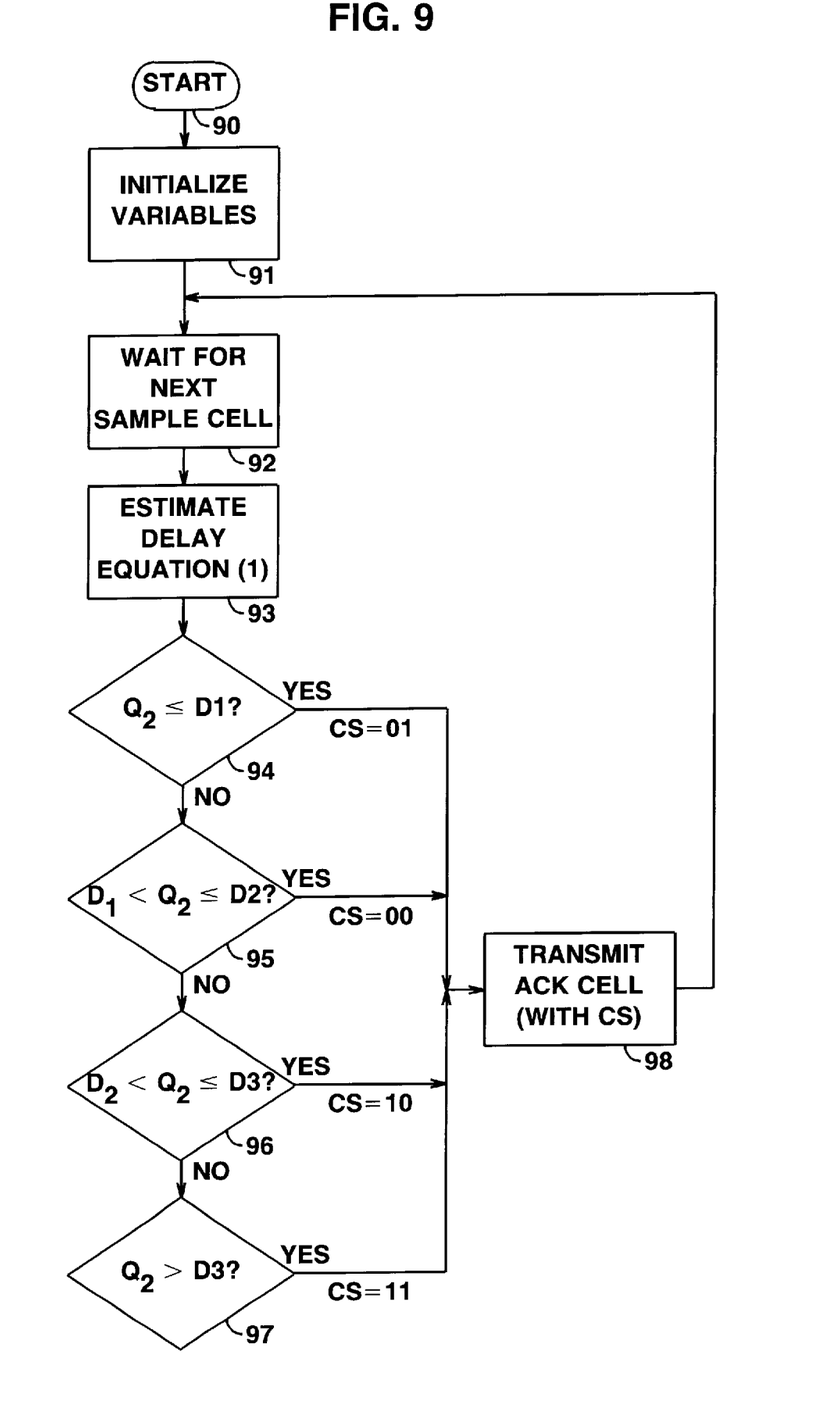
FIG. 9 shows a general flow chart of the processing of sample packets at the unreserved data destination in accordance with the present invention.

FIG. 9 shows a flow chart of the processing done at the remote destination node in boxes 24 and 25 of FIG. 3. Starting at start box 90, box 91 is entered where the variables are initialized at the remote destination node. For example, the values of Q1 and Q2, the previous (Q1) and the current (Q2) network delays, are initialized at the value of the calculated round trip transit time calculated from the data in the topology data base 45 (FIG. 2) located at that node. The sample cell transmit time and receipt times are both initialized at zero. Box 92 is then entered to await the arrival of the next sample cell. The first sample cell over any connection includes the values of D1, D2 and D3, calculated in box 51 of FIG. 7, to be used at the remote terminal of FIG. 9. When a sample cell arrives, box 93 is entered where the delay is estimated, using equation (1). Once a delay estimate is available from box 93, this estimate is successively applied to decision boxes 94, 95, 96 and 97 to determine the congestion status of the network as described above. Decision box 94, for example, determines whether the delay estimate $Q_2$ is less than or equal to D1. If so, the congestion status is "01" indicating that the congestion in the network is less than the preferred level and hence the unreserved data rate should be increased. An acknowledgment cell bearing this congestion status code is transmitted from block 98 of FIG. 9.

Decision box 95, on the other hand, determines whether the estimated delay is between D1 and D2, indicating that the network delay is in the desired range. The congestion status code "00" is encoded in the acknowledgment cell generated in box 98. If the estimated delay is between D2 and D3, as determined in decision box 96, indicating that slight congestion is occurring in the network, the congestion code "10" is encoded in the acknowledgment cell generated in box 98. Finally, if the estimated delay is greater than D3, as determined in decision box 97, indicating that serious congestion is occurring in the network, the congestion code "11" is encoded in the acknowledgment cell generated in box 98. As noted in connection with FIG. 8, these congestion states are used to process the STATE variable at the source node. Once the acknowledgment cell is transmitted in box 98, box 92 is re-entered to wait for the next sample cell.

It can be seen that the flow chart of FIG. 9 implements the portions of the algorithm of the present invention necessary at the destination node of a connection. It is clear that the processes of FIGS. 7, 8 and 9 must be implemented for each unreserved connection through the network of FIG. 1. The processes of FIGS. 6 through 9 can, of course, be implemented by designing appropriate special purpose circuits. In the preferred embodiment, however, the processes of FIGS. 3–5 are implementing by programming a general purpose computer of the type normally used to control user stations in packet or cell transmission networks. Such programming is obvious to persons skilled in the network node control and is fully disclosed in the pseudo code in the APPENDIX.

APPENDIX

Rate Change Pseudo Code

```
PROCEDURE RATE_CHANGE_POLICY
ADJ = table adjustment factor where ADJ > 1.
DE1, DE2 = decrease factors 1 and 2 where DE2 > DE1.
DR = size of the damping region.
S = size of the rate table.
STATE = index pointing to current allowed rate in rate table R.
L = lower bound of damping region.
UD = number of sampling cells sent while STATE is below L.
UD_TH = threshold value for UD.
X(t) = allowed rate at time t.
Initialization
    L = S; initial level
    UD = 0;
    UD_TH = 2 × L; threshold for UD to take action
    STATE = 1
    X(t) = R(STATE); initial rate
Case of ACKNOWLEDGMENT
    INCREASE: STATE = STATE + 1
    NO CHANGE: Do nothing
    SLIGHT CONGESTION: STATE = [DE1 × min(STATE, S)]
    SERIOUS CONGESTION: STATE = [DE2 × min(STATE, S)]
endcase; ACKNOWLEDGMENT
Case of STATE
    >L: UD = UD + 1
        if UD > UD_TH
            R(i) = R(i)/ADJ, for i = 1, 2, . . . , S
            L = L - 1
        endif
    <L + DR: R(i) × ADJ, for i = 1, 2, . . . , S
        STATE = S,
        L = L + 1
    ELSE: UD = 0
endcase; STATE
    X(t) = R(min(STATE, S))
END RATE_CHANGE_POLICY
```

What is claimed is:

1. A packet transmission network comprising
   a plurality of transmission nodes interconnected by transmission links,
   a plurality of user applications for transmitting data streams on said network, said data streams including data streams requiring reserved data paths of predefined levels of service quality and data streams requiring best efforts transmission paths,
   means for selecting reserved data paths through said network between pairs of said user applications wherein said reserved data paths have said guaranteed pre-defined levels of service quality,
   means for transmitting best efforts data on said best efforts transmission paths during those times when said reserved data paths are partially idle,
   means for controlling the access of said best efforts data to said network in order to prevent interference with data on said reserved data paths, said means for controlling the access of said best efforts data comprising
   means for detecting the level of congestion in said network,
   table driven means for controlling the rate of said best efforts data in response to said level of congestion, and
   means for multiplicatively changing the values in said table driven means in response to excessive changes in said rate of said best efforts data.

2. The packet transmission network according to claim 1 wherein said means for detecting congestion in said network comprises
   means for estimating the absolute value of the queuing delay in said network.

3. The packet transmission network according to claim 1 further comprising means for inserting a spacer between successive cells of said best efforts data.

4. The packet transmission network according to claim 3 wherein said spacer length is responsive to a time-out function, an acknowledgment, or the transmission of a minimum burst of said best efforts traffic, whichever occurs first.

5. The packet transmission network according to claim 1 wherein said means for determining the congestion in said network comprises means for transmitting a series of test samples through said network each having a time stamp containing the time of launch, means for comparing successive test samples to determine total delay through said network, and means for determining the minimum value of said total delay through said network for the duration of a connection.

6. The packet transmission network according to claim 1 further comprising means for reducing said rate of said best efforts data by a first value when said rate is less than a predetermined value, and means for reducing said rate of said best efforts data by a second value greater than said first value when said rate is at a higher value than said predetermined value.

7. The packet transmission network according to claim 1 further comprising means for initializing said rate of said best efforts data at the fair share value of the currently available bandwidth in said network.

8. A method for transmitting maximum data on a packet transmission network comprising the steps of interconnecting a plurality of transmission nodes by transmission links, transmitting data streams from a plurality of user applications on said network, said data streams including reserved path data streams requiring guaranteed levels of transmission quality and best efforts data streams requiring only the best efforts available levels of transmission quality, selecting reserved data paths through said network between pairs of said user applications wherein said reserved data paths have said guaranteed levels of service quality, transmitting best efforts data on said network during those times when said reserved data paths are partially idle, controlling the access of said best efforts data to said network in order to prevent interference with data on said reserved data paths, said step of controlling the access of said best efforts data comprising the steps of detecting the level of congestion in said network, controlling by means of a look-up table the rate of said best efforts data in response to said level of congestion, and multiplicatively changing the values in said table driven means in response to excessive changes in said rate of said best efforts data.

9. The method according to claim 8 wherein said step of detecting congestion in said network comprises the steps of estimating the absolute value of the queuing delay in said network.

10. The method according to claim 8 further comprising the step of inserting a spacer between successive cells of said best efforts data.

11. The method according to claim 10 wherein said step of inserting a spacer comprises the step of selecting said spacer length in response to a time-out function, to an acknowledgment, or to the transmission of a minimum burst of said best efforts traffic, whichever occurs first.

12. The method according to claim 8 wherein said step of determining the congestion in said network comprises the steps of transmitting a series of test samples through said network each having a time stamp containing the time of launch, comparing successive test samples to determine total delay through said network, and determining the minimum value of said total delay through said network during the duration of a connection.

13. The method according to claim 8, further comprising the steps of reducing said rate of said best efforts data by a first smaller value when said rate is less than a predetermined value, and reducing said rate of said best efforts data by a second value greater than said first value when said rate is at a higher value than said predetermined value.

14. The method according to claim 8 further comprising the step of initializing said rate of said best efforts data at the fair share value of the currently available bandwidth in said network.

15. A packet network access system having an instantaneously variable available transmission capacity at any time, said access system comprising means for detecting the level of congestion in said network, means for controlling the rate of data transmission into said network in response to said level of congestion, means for initializing said rate of data transmission into said network at a fair share of the transmission capacity available on said network at the time of initialization, means for reducing said rate of transmission by a first smaller value when said rate of transmission is less than a predetermined value, and means for reducing said rate of of transmission by a second value greater than said first value when said rate of transmission is at a higher value than said predetermined value.

16. A packet network access method for a packet network having an instantaneously variable available transmission capacity at any time, said access method comprising the steps of detecting the level of congestion in said network by transmitting a series of test samples through said network each having a time stamp containing the time of launch, and comparing successive test samples to determine total delay through said network, and determining the minimum value of said total delay through said network for the duration of a connection, controlling the rate of data transmission into said network in response to said level of congestion, and initializing said rate of data transmission into said network at a fair share of the transmission capacity available on said network at the time of initialization.

17. The packet network access method according to claim 16 further comprising the steps of reducing said rate of transmission by a first smaller value when said rate of transmission is less than a predetermined value, and reducing said rate of transmission by a second value greater than said first value when said rate of transmission is at a higher value than said predetermined value.

* * * * *